United States Patent [19] [11] Patent Number: 4,844,585
Culshaw et al. [45] Date of Patent: Jul. 4, 1989

[54] OPTICALLY EXCITED VIBRATILE TRANSDUCER

[75] Inventors: Brian Culshaw, Kilmacolm; Deepak G. Uttamchandani, Glasgow, both of Scotland

[73] Assignee: University of Strathclyde, Glasgow, Scotland

[21] Appl. No.: 163,378

[22] Filed: Mar. 2, 1988

[30] Foreign Application Priority Data

Mar. 5, 1987 [GB] United Kingdom ............... 8705151

[51] Int. Cl.$^4$ ............................................. G02B 6/02
[52] U.S. Cl. .................................................. 350/96.29
[58] Field of Search ............... 350/96.15, 96.17, 96.29; 250/227, 231 R, 231 P; 356/44

[56] References Cited

U.S. PATENT DOCUMENTS 4,521,684 6/1985 Gilby et al. ................ 250/231 R X
4,713,540 12/1987 Gilby et al. ................ 250/231 P X Primary Examiner—Frank Gonzalez
Assistant Examiner—John Ngo
Attorney, Agent, or Firm—Bell, Seltzer, Park & Gibson

[57] ABSTRACT

An optically-excited vibratile transducer (10) of microstructural form has a plurality of vibratile elements (11, 12) in stacked formation. End (10A) of the transducer (10) is connected via an optical fibre (13) to an optical device (14) for exciting and interrogating the stack. The other end (10B) of the stack is exposed to the influence of a plurality of variables, such as pressure and temperature, in a gaseous atmosphere. The elements (11, 12) are free to vibrate without mutual physical interference and are respectively decoupled from the influence of the variable. For example, element (11) is subjected to the influence of both pressure and temperature but vent (15) is provided adjacent element (12) to decouple the effect of pressure from element (12) leaving it subject only to the influence of temperature.

8 Claims, 1 Drawing Sheet

OPTICALLY EXCITED VIBRATILE TRANSDUCER

This invention relates to an optically excited vibratile transducer of microstructural form.

Optically excited vibratile transducers of microstructural form have already been demonstrated for quantitatively measuring physical variables from the effect of these variables on the resonant frequency of the vibratile element of the transducer, as disclosed in International Patent Specification No. WO 86/05271. In practice, however, variables, whether physical, chemical or biological, tend to be found as a plurality rather than singly and there is therefore a need for the transducer simultaneously to measure at least two variables if an accurate quantitative measurement is to be achieved.

It is an object of the present invention to provide an optically excited vibratile transducer of microstructural form and which is capable of measuring at least two variables simultaneously influencing the transducer.

According to the present invention there is provided an optically-excited vibratile transducer of microstructural form comprising a plurality of vibratile elements in stacked formation and having different resonant vibration frequencies, one end of the stack being connected to optical means for exciting and interrogating the stack and the other end of the stack being exposed to the influence of a plurality of variables, and means effectively interposed between said elements for successively de-coupling the respective elements substantially from the influence of respective ones of said plurality of variables.

In an example the stack includes at least one vibratile element in the form of a diaphragm located at said other end of the stack and exposed to the influence of said plurality of variables.

The stack may include a vibratile element in the form of a beam but conveniently each vibratile element in the stack is in the form of a diaphragm.

The decoupling means may take a variety of different forms. For example, where the variables include pressure this is decoupled by venting. Where the variables include chemical species these are decoupled physically by a barrier, for example in the form of a vibratile diaphragm. It is preferred that decoupling is absolute but this may be difficult to achieve in practise and is not strictly necessary provided that the degree of decoupling is substantial.

It is preferred that the vibratile elements are made of silicon. It is also preferred that the transducer is formed by a bonded plurality of silicon components. For example, one component may be a silicon disc with a silicon diaphragm formed therein by micromachining and/or etching.

It will be understood that, in use, the transducer of the present invention forms part of a measuring system incorporating calibration data pre-derived from the transducer when subjected to known conditions and the respective resonant frequencies of the vibratile elements are compared with the calibration data to enable separate quantification of the unknown variables.

Embodiments of the present invention will now be described by way of example with reference to the accompanying drawings, in which.

Figure 6:
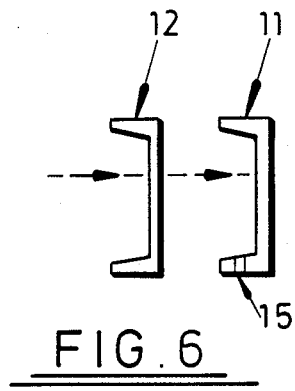

FIG. 6 schematically illustrates a second excitation technique.

Figure 1:
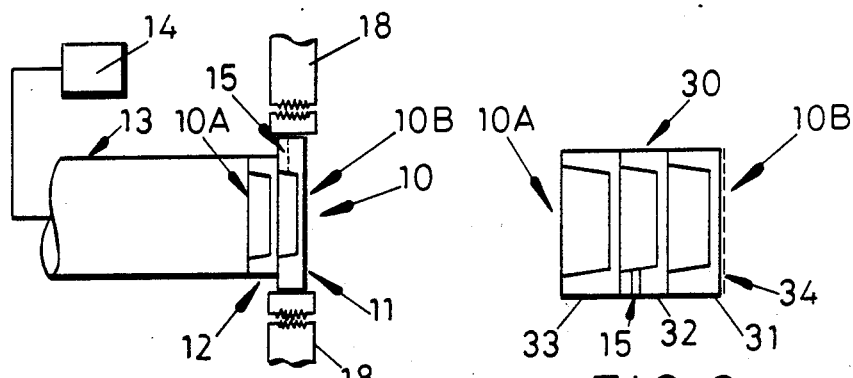
FIG. 1 shows a transducer according to the present invention.
Figure 3:
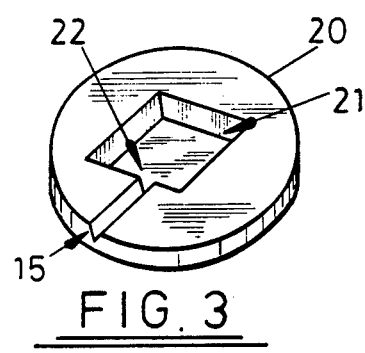
FIGS. 3 and 4 illustrate different forms of vibratile element used in transducers according to the present invention.
Figure 4:
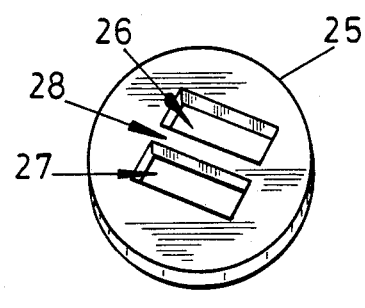

As is shown in FIG. 1 of the drawings, an optically excited vibratile transducer 10 of micro-structural form comprises two vibratile elements 11, 12, in stacked formation one end 10A of the stack being connected via an optical fibre 13 to optical means 14 for exciting and interrogating the stack. At end 10A the chamber formed between vibratile element 12 and fibre 13 is evacuated. The other end 10B of the stack is exposed to the influence of a plurality of variables in a gaseous atmosphere, in this case pressure and temperature within a housing 18, and the transducer 10 is provided with a de-coupling means in the form of a vent 15 for de-coupling element 12 from the influence of pressure within the housing 18. Elements 11, 12, in this embodiment are each in the form of a silicon disc 20 as shown in FIG. 3 micromachined and/or etched in a central region to provide a well 21 the floor of which defines a thin diaphragm 22 capable of being excited into resonant oscillation. The diaphragm of element 11 is arranged to have a different resonant frequency from that of element 12 by virtue of different diaphragm thickness. FIG. 3 also illustrates vent 15 in the form of a V-groove leading from well 21 to the periphery of the disc 20. FIG. 4 illustrates an alternative form of silicon disc 25 having micromachined apertures 26,27, in a central region thereof and separated in part by an undercut portion forming a vibratile beam 28. In a modified form of the FIG. 4 arrangement the beam is provided at one face of the silicon disc and a diaphragm is provided at the other face of the disc by virtue of the apertures 26,27, failing to penetrate the disc. In the FIG. 1 embodiment element 11 may be as illustrated in FIG. 3 whilst element 12 may be as illustrated in FIG. 4. It is however preferred that element 12 is as illustrated in FIG. 3 conveniently but not essentially without vent 15.

Figure 2:
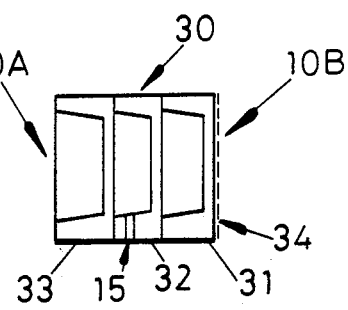
FIG. 2 shows part of a modified form of transducer according to the present invention.

In the embodiment which is illustrated in FIG. 2 transducer 30 is provided with a stack of three vibratile elements 31,32,33, element 31 being at end 10B of the stack and element 33 being at end 10A of the stack. Element 32 is provided with vent 15 which is illustrated schematically in the interests of clarity whilst element 31 has its exposed face coated with palladium 34 which is a catalytic coating material sensitive to the presence of hydrogen in an atmosphere. This transducer 30 is capable of separately measuring hydrogen content, pressure and temperature of an atmosphere, the influence of hydrogen being decoupled from elements 32,33, by the coating 34 and the influence of pressure being de-coupled from element 33 by the vent 15 in element 32.

It will be appreciated that by virtue of the stacked arrangement of vibratile elements utilised in accordance with the present invention two or more physical, chemical or biological variables, which need not include temperature can be sensed by virtue of successive de-coupling of these variables from the respective vibratile elements which are physically closely connected microstructures.

For the purpose of optically exciting the vibratile elements of the transducer 10,30, the means 14 of FIG. 1 may be arranged to issue an excitation signal (for example at 1.3 microns wavelength) which is wholly transmitted through element 12 and absorbed at least in part by element 11 which may additionally be provided with a metal coating 16 for improving wide band absorption and reflectivity, whilst the element 12 may be energised by signal (for example at 850 nanometers wavelength) which is partly absorbed by the diaphragm of element 12 and partly reflected. This arrangement is schematically illustrated in FIG. 5.

Alternatively the vibratile elements of the transducer may be excited using only a single excitation wavelength in the manner shown in FIG. 6 where diaphragm thickness is selected in conjunction with the excitation wavelength such that a fraction of the incident signal is absorbed in element 12 but the remainder of the excitation signal is transmitted to element 11 which absorbs the remainder of the transmitted excitation signal energy. For equal optical power distribution between the two elements 11,12, the two resonant diaphragms require to be of different thicknesses, the diaphragm of element 12 being thinner than the diaphragm of element 11.

Figure 5:
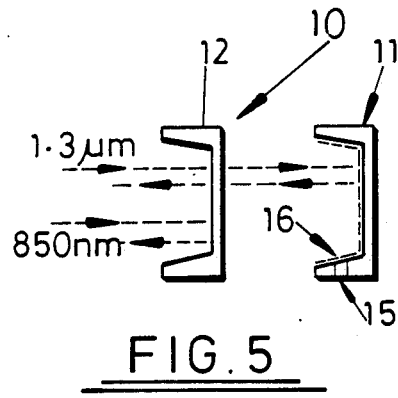
FIG. 5 shows schematically a first excitation technique.

Interrogation of the transducers 10, 30, may be effected using any of the techniques disclosed in the aforementioned International Patent Specification No. WO 86/05271 using reflected excitation signals as in FIG. 5 or using separate reflected interrogation signals as would be necessary for the FIG. 6 arrangement so that interferometric and intensity modulation techniques are applicable and may be used in a feedback mode to control the oscillation frequency of the elements 11, 12.

In order to use the transducers 10, 30, the transducer is initially subjected to calibration conditions so that, for example, element 11 produces for a series of known constant temperatures, a set of data correlating resonant frequency with pressure whilst element 12 provides a set of data correlating resonant frequency with a range of known temperatures at constant (ambient) pressure. When the transducer is in use the emergent resonant frequency signals are compared with the calibration data so that separate quantification of the unknown levels of the variables pressure, temperature, are established. A corresponding set of calibration data is prederived for the transducer 30.

The transducers 10,30, which have been described are of microstructural form and are capable of being fabricated using standard micromachining techniques. The dimensions of the transducers may be of the order of fractions of a millimeter and the levels of optical power required to excite the vibratile elements into vibration are of the order of microwatts being transmitted to the transducers by one or more optical fibres so that the system is capable of operating over very long distances, is immune to electromagnetic interference, is chemically passive, light in weight and inherently capable of operating with extremely high accuracy due to resonant frequency transduction without signal distortion and without the need for optical reference signals.

What is claimed is:

1. An optically-excited vibratile transducer of microstructural form capable of measuring a plurality of variables simultaneously influencing the transducer, said transducer comprising a plurality of vibratile elements arranged in a stack formation and including a first vibratile element at a first end of the stack and a second vibratile element at a second end of the stack, the vibratile elements having different resonant vibration frequencies and being mutually separated along the length of the stack so as to be free to vibrate without mutual physical interference and, wherein the first end of the stack, including said first vibratile element, is exposed to the simultaneous influence of the plurality of variables and the second end of the stack is connected to optical means for exciting and interrogating each of the vibratile elements of the stack by transmission of optical energy through the second vibratile element and along the length of the stack, and means effectively interposed between said vibratile elements for successively decoupling the respective vibratile elements other than said first vibratile element substantially from the influence of respective ones of said plurality of variables.

2. A transducer as claimed in claim 1, wherein the first vibratile element is in the form of a diaphragm.

3. A transducer as claimed in claim 2, wherein each vibrate element in the stack is in the form of a diaphragm.

4. A transducer as claimed in claim 1, wherein the stack includes a vibratile element in the form of a beam.

5. A transducer as claimed in claim 2, wherein said decoupling means comprises a vent extending from the space between two adjacent vibratile elements for decoupling pressure.

6. A transducer as claimed in claim 2, wherein said decoupling means comprises a catalytic coating on the diaphragm.

7. A transducer as claimed in claim 3, wherein each diaphragm has a different resonant frequency by virtue of the diaphragms having different thickness.

8. A transducer as claimed in claim 1 wherein each vibratile element is mounted on a substrate and the stack is formed by the plurality of substrates being bonded together.

* * * * *